US009584787B1

(12) United States Patent
Belovay

(10) Patent No.: US 9,584,787 B1
(45) Date of Patent: Feb. 28, 2017

(54) PERFORMANCE OPTIMIZATION FOR STREAMING VIDEO

(75) Inventor: Keith E. Belovay, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 965 days.

(21) Appl. No.: 13/491,949

(22) Filed: Jun. 8, 2012

(51) Int. Cl.
  *H04N 7/50* (2006.01)
  *H04N 9/804* (2006.01)
  *H04N 5/85* (2006.01)

(52) U.S. Cl.
  CPC ............. *H04N 9/8042* (2013.01); *H04N 5/85* (2013.01)

(58) Field of Classification Search
  CPC ............... H04N 7/50; H04N 19/00781; H04N 19/00278; H04N 19/00084; H04N 19/00884; H04N 19/00763
  USPC ........................................................ 375/240
  See application file for complete search history.

(56) References Cited

U.S. PATENT DOCUMENTS

| | | | |
|---|---|---|---|
| 6,112,325 A * | 8/2000 | Burshtein | H04L 1/0046 714/774 |
| 6,633,339 B1 * | 10/2003 | Goto et al. | 348/425.4 |
| 6,850,564 B1 * | 2/2005 | Pejhan | H04N 7/14 348/404.1 |
| 2007/0058684 A1 * | 3/2007 | Soroushian | H04N 21/23614 370/535 |

* cited by examiner

*Primary Examiner* — Dave Czekaj
*Assistant Examiner* — Berteau Joisil
(74) *Attorney, Agent, or Firm* — Thomas | Horstemeyer, LLP

(57) ABSTRACT

Disclosed are various embodiments for a streaming video application. The application downloads, decodes, and renders video frame data at different frame rates. Based on the differences between these frame rates, the downloading frame rate is adjusted to minimize performance degradation.

19 Claims, 5 Drawing Sheets

| Performance History 133 | | | | | |
|---|---|---|---|---|---|
| Framerate Bucket 301 | Δ (Download / Renderer), IN 313 | Δ (Download / Renderer), Current 302 | Δ (Download / Renderer), OUT 307 | Δ (Download / Decoder), IN 316 | Δ (Download / Decoder), Current 304 | Δ (Download / Decoder), OUT 311 |
| 10-12 | 3 | 0 | 0 | 2 | 0 | 0 |
| 13-15 | 4 | 2.2 | 1 | 3 | 1.4 | 1 |
| 16-18 | 6 | 4.1 | 4 | 4 | 2.6 | 3 |
| 19-22 | 9 | 6.8 | 5 | 5 | 3.1 | 4 |
| ⋮ | ⋮ | ⋮ | ⋮ | ⋮ | ⋮ | ⋮ |

FIG. 3

PERFORMANCE OPTIMIZATION FOR STREAMING VIDEO

BACKGROUND

Many devices have the capability to receive streamed video data. Problems arise when a device receives data at a rate greater than it can render the data.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 is a flowchart illustrating one example of maintaining a performance history implemented as portions of the performance optimization for streaming video executed in a display device in the networked environment of FIG. 1 according to various embodiments of the present disclosure.

DETAILED DESCRIPTION

Disclosed are various embodiments of a performance optimization for streaming video to display devices. Many devices are capable of receiving and rendering streaming video data. As a non-limiting example, a cellular phone can stream video data from a video service via a cellular data network and render the streamed video data on the screen of the phone. Often times, the display device receives the streamed video data at a much faster rate than the display device can render. For example, if the display device receives a video stream at 30 frames per second and can only render at 15 frames per second, the unrendered data will begin to accumulate in a buffer. When the buffer fills, the user will experience a noticeable error in the rendering. By analyzing various attributes of the client device, it is possible to optimize the rate at which the device receives streaming video data such that errors noticeable to the user are minimized or eliminated.

Figure 1:
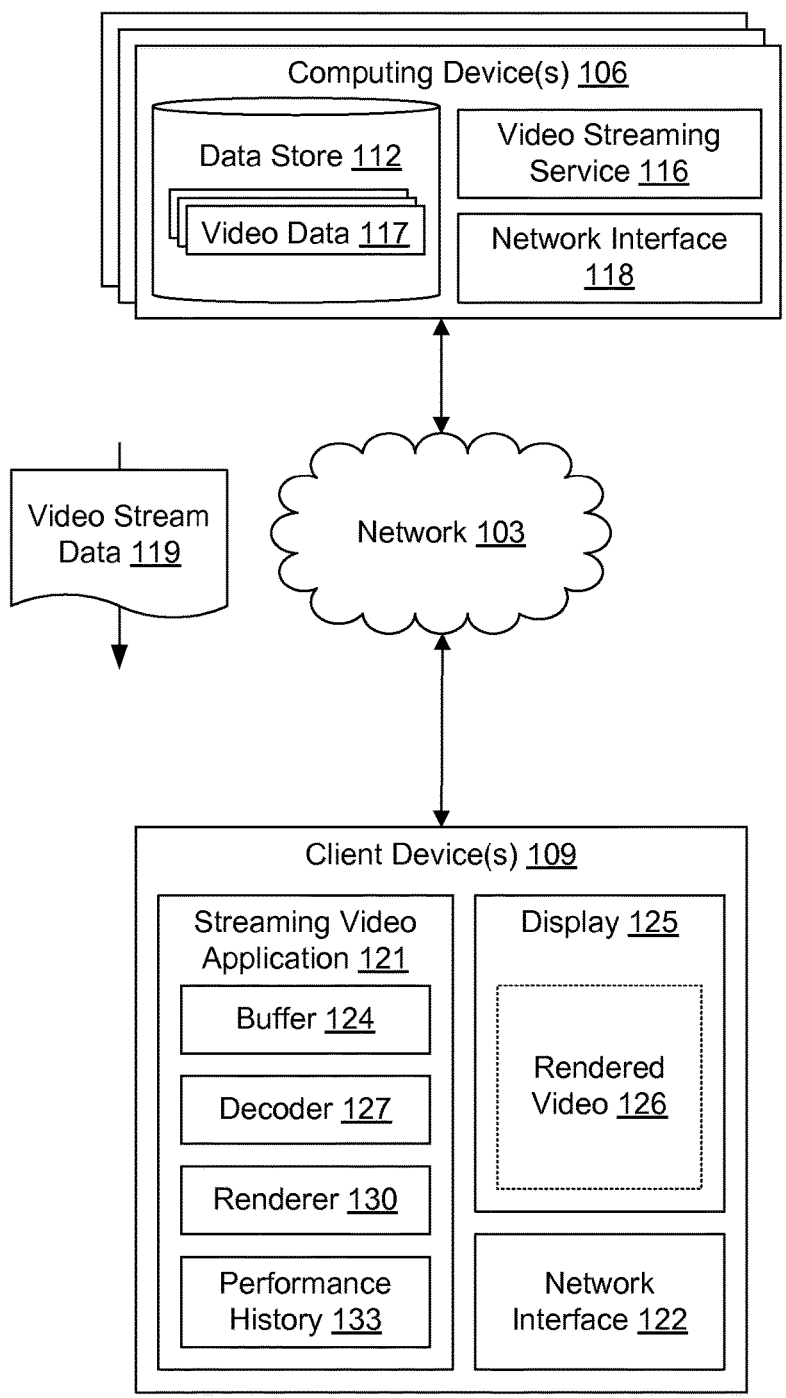
FIG. 1 is a drawing of the networked environment according to various embodiments of the present disclosure.

With reference to FIG. 1, shown is a networked environment 100 according to various embodiments. The networked environment 100 includes a network 103, a computing device 106, and a client device 109. The network 103 includes, for example, the Internet, intranets, extranets, wide area networks (WANs), local area networks (LANs), wired networks, wireless networks, or other suitable networks, etc., or any combination of two or more such networks.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device is referred to in the singular, it is understood that a plurality of computing devices 106 may be employed in the various arrangements as described above.

Various applications and/or other functionality may be executed in the computing device 106 according to various embodiments. Also, various data is stored in a data store 112 that is accessible to the computing device 106. The data store 112 may be representative of a plurality of data stores as can be appreciated. The data stored in the data store 112 for example, is associated with the operation of the various applications and/or functional entities described below.

The components executed on the computing device 106, for example, include video streaming service 116, and other applications, services, processes, systems, engines, or functionality not discussed in detail herein. The video streaming service 116 is executed to facilitate the streaming of video data 117 over the network 103 as video stream data 119 to a client device 109.

The data stored in the data store 112 includes, for example, video data 117, and potentially other data.

The client device 109 is representative of a plurality of display devices that may be coupled to the network 103. The client device 109 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client device 109 may be configured to execute various applications such as a streaming video application 121 and/or other applications. The streaming video application 121 may be executed in a client device 109, for example, to download and render video stream data 119, or other network content served up by the computing device 106 and/or other servers. The client device 109 may be configured to execute applications beyond streaming video application 121 such as, for example, email applications, instant message applications, and/or other applications. The client device 109 also includes a display 125 upon which rendered video 126 is displayed.

Next, a general description of the operation of the various components of the networked environment 100 is provided. To begin, computing device 106 executes video streaming service 116, which streams video data 117 as video stream data 119 over network 103 through network interface 118 when a request to begin streaming is received from a client device 109. Video data 117 may be retrieved from a data store 112, from a video stream, a real-time video source, or another source.

Client device 109 executes a streaming video application 121, which requests video stream data 119 be sent to the client device 109 at a download frame rate via network 103. Client device 109 downloads the video stream data 119 through network interface 122. Streaming video application 121 stores the downloaded video stream data 119 into a buffer 124. The downloaded video stream data 119 may require decoding before it can be rendered for viewing. Decoder 127 decodes the video stream data in the buffer 124 at a decoding frame rate, which may be different from the download frame rate at which the network interface 122 downloads video stream data 119. Renderer 130 then renders the decoded video stream data 119 at a rendering frame rate for viewing on the display 125 of client device 109. The rendering frame rate may be different from both the downloading frame rate and the decoding frame rate. The streaming video application also maintains a performance history 133, storing performance statistics relative to the downloading frame rate. The performance history 133 is used in determining whether changing the downloading frame rate will improve or degrade performance.

When the differences between the downloading frame rate, the decoding frame rate, and the rendering frame rate exceed a tolerable threshold, the user of the client device 109 may experience a noticeable error in rendering. The performance optimization for streaming video modifies the downloading frame rate to minimize the differences between the downloading frame rate, decoding frame rate, and rendering frame rate, and thereby minimizing rendering errors.

Figure 2:
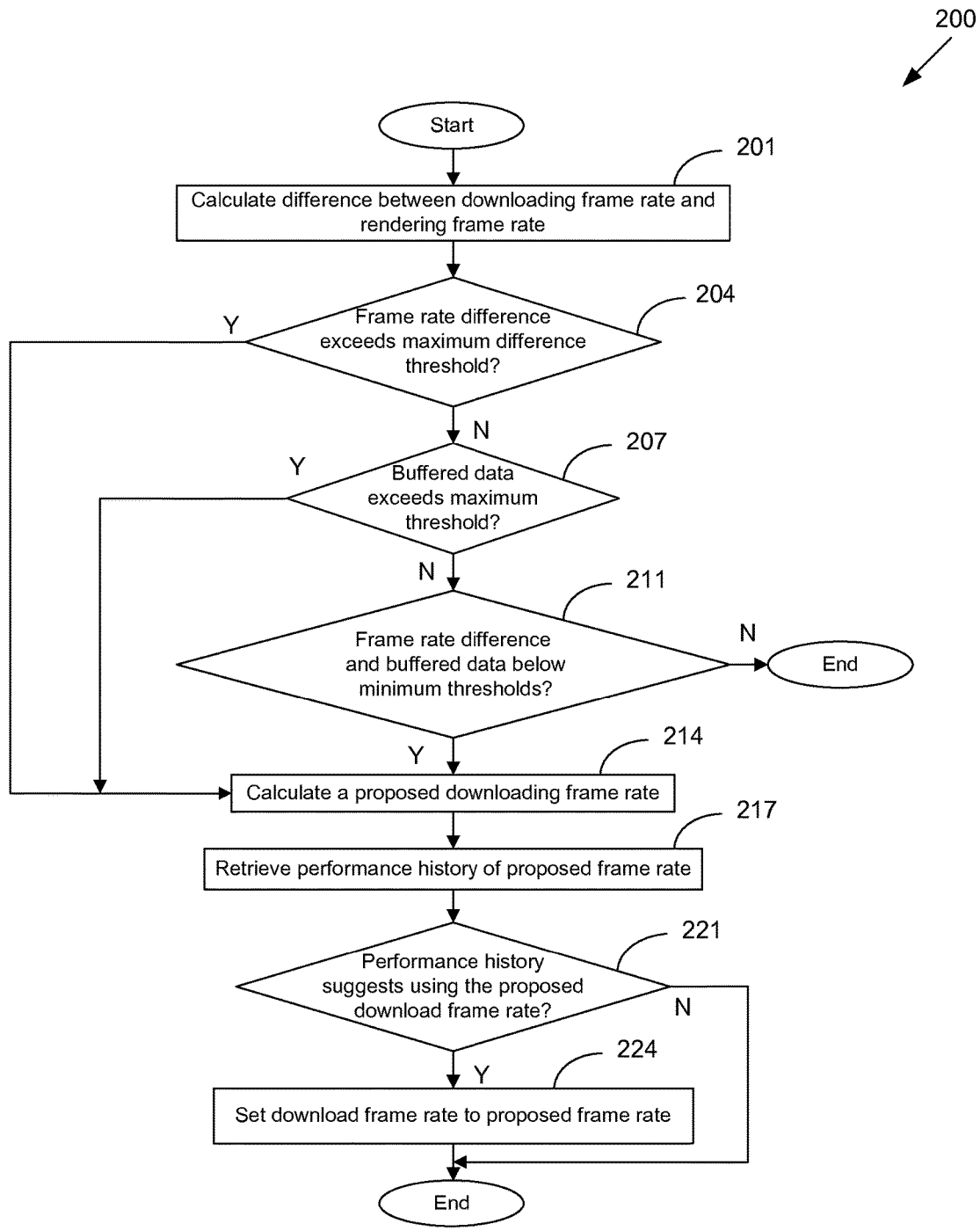
FIG. 2 is a flowchart illustrating one example of functionality implemented as portions of the performance optimization for streaming video in a display device in the networked environment of FIG. 1 according to various embodiments of the present disclosure.

Referring next to FIG. 2, shown is a flowchart that provides one example of the operation of a portion of the performance optimization for streaming video according to various embodiments. It is understood that the flowchart of FIG. 2 provides merely an example of the many different types of functional arrangements that may be employed to implement the operation of the portion of the performance optimization for streaming video as described herein. As an alternative, the flowchart of FIG. 2 may be viewed as depicting an example of steps of a method implemented in the client device 109 (FIG. 1) according to one or more embodiments.

In some embodiments, operation depicted in FIG. 2 is performed by the client device 109 while streaming video from a computing device 106 (FIG. 1) via a network 103 (FIG. 1). When the client device 109 downloads video stream data 119 (FIG. 1) at a rate much faster than the client device 109 can render, visible errors can occur. The operation depicted in FIG. 2 determines when to adjust the downloading frame rate to minimize errors. If the display frame rate is near or equal to the downloading frame rate, the operation determines when to increase the downloading frame rate in order to render at the highest frame rate possible without errors. These determinations are based on the difference between the downloading and rendering frame rates, the difference between the downloading and decoding frame rates, buffer usage, performance history, and potentially other factors.

Beginning with box 201, the difference between the downloading frame rate, i.e., the rate at which client device 109 downloads video stream data 119 downloads data over network 103, and the rendering frame rate is calculated. In box 204, if this frame rate difference is too great and exceeds a threshold there may be a need to modify the downloading frame rate, and the operation moves to box 214, wherein a proposed downloading frame rate is calculated. For example, if the downloading frame rate is 30 frames per second and the rendering frame rate is 15 frames per second, the resulting frame rate difference is 15 frames per second. If the maximum frame rate difference threshold is 10, there may be a need to modify the frame rate, and the operation will proceed to box 214.

If the frame rate difference does not exceed the threshold, there may be a need to modify the downloading frame rate if other conditions are met, so the operation proceeds to box 207. In box 207, the amount of video stream data 119 stored buffer 124 (FIG. 1) is measured to determine of the amount of buffered data exceeds another threshold. If the amount of buffered data exceeds the threshold there may be a need to modify the downloading frame rate, and the operation proceeds to box 214. For example, if there are 8 milliseconds of data stored in the buffer and the maximum buffered data threshold is 5 milliseconds, the operation proceeds to box 214 to calculate a proposed downloading frame rate.

If the amount of buffered data does not exceed the threshold, there still may be a need to modify the downloading frame rate should other conditions be met. In box 211, the operation determines if the frame rate difference is below a minimum threshold, and if the amount of buffered data is below a minimum threshold. If both of these conditions are satisfied, then there may be a need to modify the downloading frame rate, and the operation proceeds to box 214. For example, if the frame rate difference is 0 frames per second and there is no buffered data, the operation proceeds to box 214 to calculate a proposed downloading frame rate. If both of these conditions are not satisfied, then the downloading frame rate will stay the same and the operation ends.

Prior to entering box 214, it has been determined that the downloading frame rate may need to be modified. In some situations, such as when the difference between the downloading frame rate and rendering frame rate exceeds a maximum threshold as shown in box 204, or the difference between the downloading frame rate and rendering frame rate is below a maximum threshold, but the amount of buffered data exceeds a maximum threshold as shown in box 207, this may result in a reduced downloading frame rate. In further situations, such as when the difference between the downloading frame rate and rendering frame rate is below a minimum threshold and the amount of buffered data is below a minimum threshold as shown in box 211, this may result in an increased frame rate.

In box 214, a proposed downloading frame rate is calculated. In some embodiments, the proposed downloading frame rate is calculated by incrementing or decrementing the downloading frame rate by a fixed amount. For example, a proposed downloading frame rate may be 5 frames per second faster than the current downloading frame rate. In other embodiments, the proposed downloading frame rate is calculated by incrementing or decrementing the downloading frame rate by a percentage of the difference between the downloading frame rate and the rendering frame rate. For example, the proposed downloading frame rate may be the current downloading frame rate minus seventy percent of the frame rate difference. These are non-limiting examples, and other methods of calculating the proposed frame rate may be used.

In box 217 the operation accesses the performance history 133 (FIG. 1) to look up statistics with respect to past performance at the proposed downloading frame rate. Moving to box 221, the operation determines if the downloading frame rate should be set to the proposed downloading frame rate based on the performance history 133. In some embodiments, if the proposed downloading frame rate is less than the current downloading frame rate, the downloading frame rate should be modified if the performance history 133 suggests a performance increase. In other embodiments, if the proposed downloading frame rate is greater than the current downloading frame rate, the downloading frame rate should be modified if the performance history 133 suggests that there will not be a performance decrease. In further embodiments, where the performance history 133 lacks sufficient entries to indicate a performance increase or decrease at the proposed downloading frame rate, the downloading frame rate will be modified to the proposed downloading frame rate.

A performance increase may be determined as a function of the downloading frame rates, decoding frame rates, and rendering frame rates with respect to the current downloading frame rate and the proposed downloading frame rate, or other factors.

If the determination made in box 221 based on the performance history 133 suggests that the downloading frame rate should not be modified, the operation ends. Otherwise, the operation proceeds to box 224 where the downloading frame rate is set to the proposed downloading frame rate.

Turning to FIG. 3, shown is an example model for implementing a performance history 133 (FIG. 1) in the performance optimization for streaming video. Each entry in the performance history 133 is stored relative to a frame rate bucket 301. A frame rate bucket 301 represents a range of downloading frame rates, each bucket being of equal size. As a non-limiting example in FIG. 4, each frame rate bucket 301 represents three consecutive frame rates, but there is no maximum or minimum size for a frame rate bucket 301. When an entry is stored into the performance history 133 relative to a frame rate, it is stored in the attribute entry of the corresponding frame rate bucket 301. In some embodiments, storing a value as an entry in the performance history 133 comprises storing a weighted average of the existing entry and the value to be stored.

Moving on to the different entries of performance history 133, entry 302 represents the difference between the downloading frame rate and the rendering frame rate at the time the entry was stored. Entry 304 represents the difference between the downloading frame rate and the decoding frame rate at the time the entry was stored. Entries 302 and 304 are stored relative to the frame rate bucket 301 corresponding to the downloading frame rate. In some embodiments, entries 302 and 304 are stored at a predefined time interval.

Entries 307, 311, 313, and 316 are stored when the performance optimization for streaming video modifies the downloading frame rate from a prior downloading frame rate to a subsequent downloading frame rate as shown in box 224 (FIG. 2). Entry 307 represents the difference between the downloading frame rate and the rendering frame, relative to the prior downloading frame rate. Entry 311 represents the difference between the downloading frame rate and the decoding frame rate, relative to the prior downloading frame rate. Entry 313 represents the difference between the downloading frame rate and the rendering frame, relative to the subsequent downloading frame rate. Entry 316 represents the difference between the downloading frame rate and the decoding frame rate, relative to the subsequent downloading frame rate.

Figure 4:
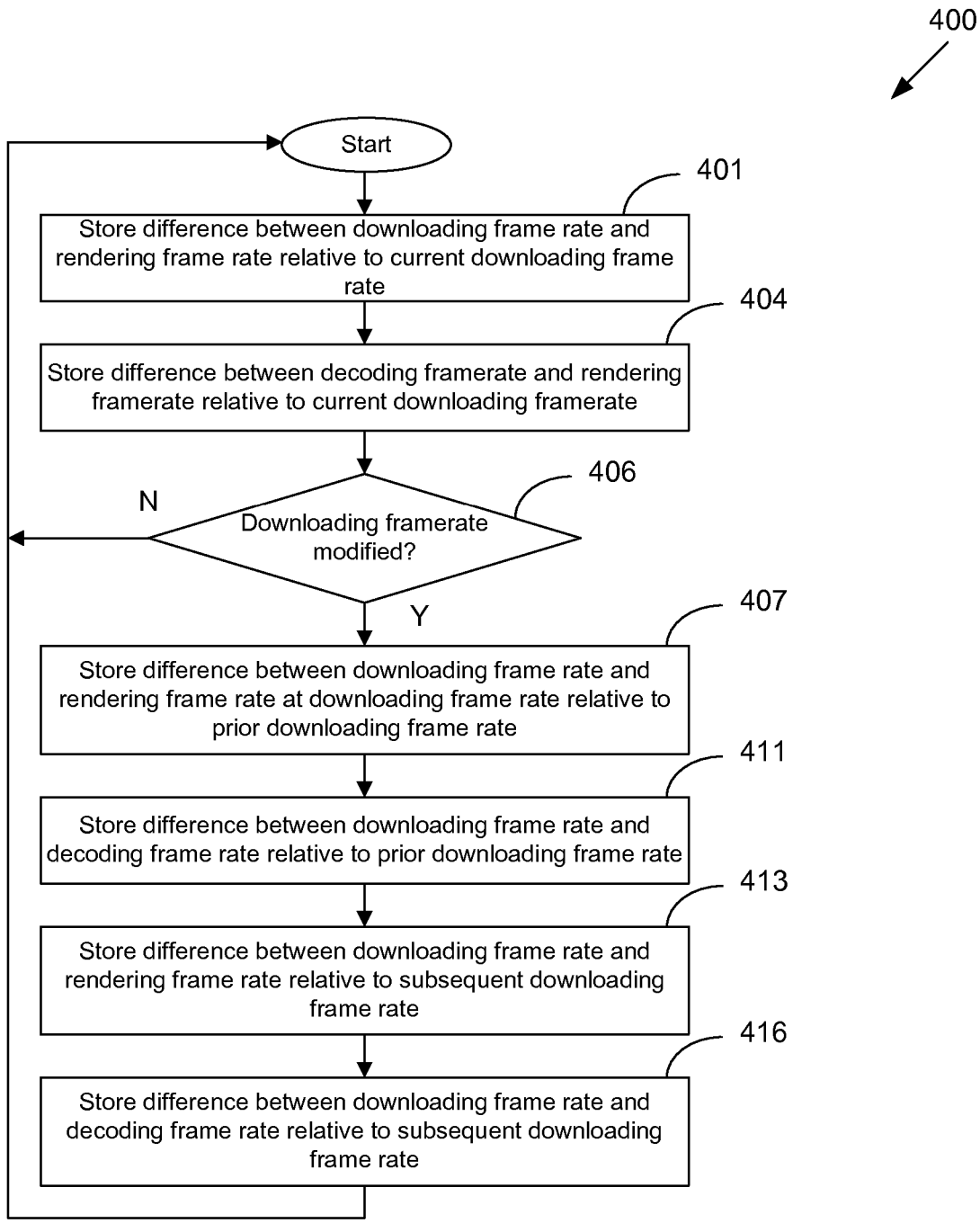
FIG. 4 is a drawing of one way to model a performance history as implemented in the performance optimization for streaming video executed in a display device in the networked environment of FIG. 1 according to various embodiments of the present disclosure.

Referring next to FIG. 4, shown is a flowchart that provides one example of the operation of updating the performance history of the performance optimization for streaming video according to various embodiments. It is understood that the flowchart of FIG. 4 provides merely an example of the many different types of functional arrangements that may be employed to implement the operation of updating the performance history of the performance optimization for streaming video as described herein. As an alternative, the flowchart of FIG. 4 may be viewed as depicting an example of steps of a method implemented in the client device 109 (FIG. 1) according to one or more embodiments.

In some embodiments, the operation performed in FIG. 4 is used to maintain a performance history 133 (FIG. 1). Data relative to the current downloading frame rate is repeatedly stored at a fixed interval. This repetitive updating continues until the operation in FIG. 2 modifies the downloading frame rate. When the modification occurs, the operation of FIG. 4 stores data relative to the prior downloading frame rate and the subsequent downloading frame rate at the time of the modification. In some embodiments, storing a value into the performance history may be a function of an existing entry, a value to be stored, and other values. For example, in some embodiments, storing a value as an entry into the performance history 133 comprises storing a weighted average of an existing entry and the value to be stored. In another example, storing an entry into the performance history 133 may be replacing an existing entry with the value to be stored.

Starting with box 401, the operation stores the difference 302 (FIG. 3) between the downloading frame rate and the rendering frame rate relative to the current downloading frame rate (301, FIG. 3). Next, in box 404, the operation stores the difference 304 (FIG. 3) between the downloading frame rate and the decoding frame rate relative to the current downloading frame rate 301. Moving to box 406, boxes 401 and 404 are repeated until the downloading frame rate is modified as shown in box 224 of FIG. 2.

When the downloading frame rate is modified from a prior downloading frame rate to a subsequent downloading frame rate, box 407 stores the difference 307 (FIG. 3) between the downloading frame rate and the rendering frame rate relative to the prior downloading frame rate 301. Next, box 411 stores the difference 311 (FIG. 3) between the downloading frame rate and the decoding frame rate relative to the prior downloading frame rate 301. Moving on to box 413, the operation stores the difference 313 (FIG. 3) between the downloading frame rate and the rendering frame rate relative to the subsequent frame rate downloading frame rate 301. Next, box 416 stores the difference 316 (FIG. 3) between the downloading frame rate and the decoding frame rate relative to the subsequent downloading frame rate 301. Once boxes 407, 411, 413, and 416 have stored the four performance history entries 307, 311, 313, and 316 triggered by the modification of the downloading frame rate, the operation repeats.

Figure 5:
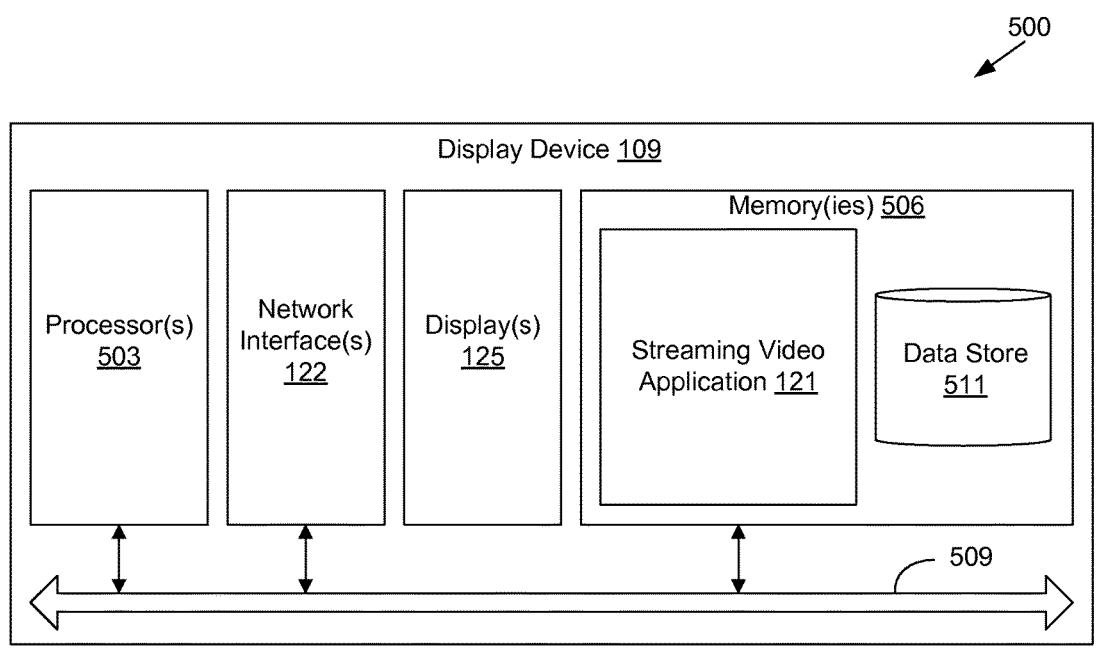
FIG. 5 is a schematic block diagram that provides one example illustration of a display device employed in the networked environment of FIG. 1 according to various embodiments of the present disclosure.

With reference to FIG. 5, shown is a schematic block diagram of the client device 109 according to an embodiment of the present disclosure. The client device 109 includes at least one processor circuit, for example, having a network interface 122, a processor 503, and a memory 506, all of which are coupled to a local interface 509. To this end, the client device 109 may comprise, for example, at least one server computer or like device. The local interface 509 may comprise, for example, a data bus with an accompanying address/control bus or other bus structure as can be appreciated. Client device 109 may further comprise a display 125.

Stored in the memory 506 are both data and several components that are executable by the processor 503. In particular, stored in the memory 506 and executable by the processor 503 are a streaming video application 121, and potentially other applications. Also stored in the memory 506 may be a data store 511 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 103 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although a streaming video application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 4 show the functionality and operation of an implementation of portions of the performance optimization for streaming video. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2 and 4 show a specific order of execution, it is understood that the order of execution may differ from that which is depicted. For example, the order of execution of two or more blocks may be scrambled relative to the order shown. Also, two or more blocks shown in succession in FIGS. 2 and 4 may be executed concurrently or with partial concurrence. Further, in some embodiments, one or more of the blocks shown in FIGS. 2 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including streaming video application 121, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein when executed the program causes the computing device to at least:
   download a video frame data from a network and store the video frame data into a buffer at a first frame rate;
   decode the video frame data at a second frame rate;
   render the video frame data for viewing at a third frame rate;
   store, at a predefined time interval, a first attribute expressing a difference between the first frame rate and the second frame rate;
   store, at the predefined time interval, a second attribute expressing a difference between the first frame rate and the third frame rate;
   store, when the first frame rate is altered from a prior first frame rate to a subsequent first frame rate, a third attribute expressing the difference between the first frame rate and the second frame rate;
   store, when the first frame rate is altered from the prior first frame rate to the subsequent first frame rate, a fourth attribute expressing the difference between the first frame rate and the third frame rate; and
   determine whether to alter the first frame rate by a predefined amount based at least in part on at least one of a difference between the first frame rate and the third frame rate, a utilization rate of the buffer, an amount of data stored in the buffer, or an estimate of whether altering the first frame rate will result in a performance increase, wherein the estimate is based at least in part on a stored attribute.

2. The non-transitory computer-readable medium of claim 1, wherein the first attribute further expresses the first frame rate, and the second attribute further expresses the first frame rate.

3. The non-transitory computer-readable medium of claim 1, wherein the third attribute further expresses the prior first frame rate, and the fourth attribute further expresses the prior first frame rate.

4. The non-transitory computer-readable medium of claim 1, wherein the third attribute further expresses the subsequent first frame rate, and wherein the fourth attribute further expresses the subsequent first frame rate.

5. The non-transitory computer-readable medium of claim 1, wherein when executed the program further causes the computing device to at least calculate the predefined amount as a percentage of the difference between the first frame rate and the third frame rate.

6. The non-transitory computer-readable medium of claim 1, wherein the predefined amount comprises a fixed number.

7. A system, comprising:
   at least one computing device storing instructions that when executed cause the at least one computing device to at least:
   download a video stream data from a network at a first frame rate;
   store the video stream data into a buffer;
   decode the video stream data from the buffer into a stream of video frames at a second frame rate;
   render the video frames on a user interface at a third frame rate;
   store, at a predefined time interval, a first attribute expressing a difference between the first frame rate and the second frame rate;
   store, at the predefined time interval, a second attribute expressing a difference between the first frame rate and the third frame rate; and
   modify the first frame rate as a function of at least an amount of data stored in the buffer and a difference between the first frame rate and one of the second or third frame rates.

8. The system of claim 7, wherein modifying the first frame rate further comprises modifying the first frame rate by a fixed value.

9. The system of claim 7, wherein modifying the first frame rate further comprises modifying the first frame rate by a value comprising a percentage of the difference between the first frame rate and the third frame rate.

10. The system of claim 7, wherein when executed the instructions further cause the at least one computing device to at least:
   store, when the first frame rate is modified, a third attribute expressing the difference between the first frame rate and the second frame rate; and
   store, when the first frame rate is modified, a fourth attribute expressing the difference between the first frame rate and the third frame rate.

11. The system of claim 10, wherein storing one of the first, second, third, or fourth attributes comprises storing a weighted average of a respective first, second, third, or fourth attribute and a previously stored version of the respective first, second, third, or fourth attribute.

12. The system of claim 7, wherein modifying the first frame rate comprises modifying the first frame rate as a function of at least one stored attribute.

13. A method, comprising:
   calculating, in a computing device, a frame rate difference between a first frame rate and a second frame rate, the first frame rate comprising a first number of frames that a network stream interface requests to be sent from a network in a predefined time interval, and the second frame rate comprising a rate at which a second number of frames are rendered for viewing in the predefined time interval;
   storing, in the computing device, at a predefined time interval, a first attribute expressing the difference between the first frame rate and the second frame rate;
   determining, in the computing device, whether to alter the first frame rate by a predefined amount as a function of at least the frame rate difference and an amount of frame data stored in a buffer in the computing device into which the network stream interface stores a frame data;

determining, in the computing device, the predefined amount in response to the determination to alter the first frame rate; and setting, in the computing device, the first frame rate to the predefined amount.

14. The method of claim 13, wherein the predefined amount comprises a percentage of the frame rate difference.

15. The method of claim 13, wherein the predefined amount comprises a fixed value.

16. The method of claim 13, wherein determining whether to alter the first frame rate by the predefined amount is further based at least in part on estimating whether altering the first frame rate will result in a performance increase.

17. The method of claim 13, wherein determining whether to alter the first frame rate by the predefined amount is further based at least in part on estimating whether altering the first frame rate will result in a performance decrease.

18. The system of claim 7, wherein when executed the instructions further cause the at least one computing device to at least estimate whether altering the first frame rate will result in a performance increase.

19. The system of claim 7, wherein when executed the instructions further cause the at least one computing device to at least estimate whether altering the first frame rate will result in a performance decrease.

\* \* \* \* \*